(12) United States Patent
Boyce (10) Patent No.: US 8,566,921 B2
(45) Date of Patent: Oct. 22, 2013

(54) METHOD AND SYSTEM FOR PROTECTING A COMPUTER SYSTEM DURING BOOT OPERATION

(75) Inventor: Kevin Gerard Boyce, Chelsea (CA)

(73) Assignee: Trend Micro Incorporated, Tokyo (JP)

(*) Notice: Subject to any disclaimer, the term of this patent is extended or adjusted under 35 U.S.C. 154(b) by 0 days.

(21) Appl. No.: 13/527,476

(22) Filed: Jun. 19, 2012

(65) Prior Publication Data

US 2012/0266232 A1 Oct. 18, 2012

Related U.S. Application Data (63) Continuation of application No. 12/045,949, filed on Mar. 11, 2008, now Pat. No. 8,220,041.

(60) Provisional application No. 61/013,491, filed on Dec. 13, 2007.

(51) Int. Cl.
*G06F 9/00* (2006.01)
*G06F 15/177* (2006.01)
*G06F 9/455* (2006.01)

(52) U.S. Cl.
USPC .................... 726/13; 713/2; 709/222; 718/1

(58) Field of Classification Search
USPC .................... 726/13; 713/2; 709/222; 718/1
See application file for complete search history.

(56) References Cited

U.S. PATENT DOCUMENTS

| | | | |
|---|---|---|---|
| 6,272,629 B1 | 8/2001 | Stewart | |
| 6,327,660 B1 * | 12/2001 | Patel | ............................ 713/193 |
| 6,463,537 B1 | 10/2002 | Tello | |
| 6,467,041 B1 | 10/2002 | Blam | |
| 6,477,648 B1 * | 11/2002 | Schell et al. | .................... 726/22 |
| 6,507,906 B1 | 1/2003 | Criddle et al. | |
| 7,302,698 B1 | 11/2007 | Proudler et al. | |
| 7,467,202 B2 | 12/2008 | Savchuk | |
| 7,562,175 B2 | 7/2009 | Dunham et al. | |
| 7,730,464 B2 | 6/2010 | Trowbridge | |
| 2002/0120858 A1 | 8/2002 | Porter et al. | |
| 2003/0145235 A1 | 7/2003 | Choo | |
| 2003/0200428 A1 * | 10/2003 | Chan et al. | ........................ 713/1 |
| 2004/0034794 A1 | 2/2004 | Mayer et al. | |
| 2004/0064457 A1 | 4/2004 | Zimmer et al. | |
| 2004/0158698 A1 * | 8/2004 | Rothman et al. | ................... 713/1 |
| 2005/0071623 A1 * | 3/2005 | Goud et al. | ................... 713/100 |
| 2005/0120242 A1 | 6/2005 | Mayer et al. | |
| 2005/0125691 A1 | 6/2005 | Garg et al. | |
| 2005/0149729 A1 | 7/2005 | Zimmer et al. | |
| 2006/0185015 A1 * | 8/2006 | Cheston et al. | .................. 726/24 |
| 2006/0215659 A1 * | 9/2006 | Rothman et al. | ............. 370/392 |
| 2006/0233174 A1 * | 10/2006 | Rothman et al. | ............. 370/392 |
| 2007/0006282 A1 | 1/2007 | Durham et al. | |
| 2007/0105587 A1 | 5/2007 | Lu | |
| 2007/0180509 A1 | 8/2007 | Swartz et al. | |
| 2007/0199060 A1 * | 8/2007 | Touboul | .......................... 726/11 |
| 2007/0260868 A1 | 11/2007 | Azzarello et al. | |
| 2007/0289019 A1 | 12/2007 | Lowrey | |

(Continued)

*Primary Examiner* — Techane Gergiso
(74) *Attorney, Agent, or Firm* — IP-MEX INC.; Victoria Donnelly (57) ABSTRACT

A method for protecting a computer system from malicious network traffic is provided using a driver which inspects network packets. A security profile comprising packet inspection rules is compiled and stored on the computer system. During the startup or boot operation of an operating system, the driver loads the compiled security profile and inspects network packets using the inspection rules.

20 Claims, 5 Drawing Sheets

(56) References Cited

U.S. PATENT DOCUMENTS

| | | |
|---|---|---|
| 2008/0034429 A1 | 2/2008 | Schneider |
| 2008/0046709 A1 | 2/2008 | Wang |
| 2008/0086768 A1 | 4/2008 | Mirza-Baig |
| 2008/0127292 A1 | 5/2008 | Cooper et al. |
| 2008/0229381 A1 | 9/2008 | Sikka et al. |
| 2008/0244257 A1 | 10/2008 | Vaid et al. |
| 2008/0271163 A1 | 10/2008 | Stillerman et al. |
| 2008/0313312 A1 | 12/2008 | Flynn et al. |
| 2009/0113403 A1 | 4/2009 | Davis et al. |
| 2010/0023739 A1* | 1/2010 | Levit-Gurevich et al. ........ 713/2 |

* cited by examiner

METHOD AND SYSTEM FOR PROTECTING A COMPUTER SYSTEM DURING BOOT OPERATION

RELATED APPLICATIONS

The present invention is a Continuation application of U.S. application Ser. No. 12/045,949 filed on Mar. 11, 2008, now U.S. Pat. No. 8,220,041 which has now been allowed, which claims priority from the U.S. provisional application to BOYCE, Kevin, Ser. No. 61/013,491 filed on Dec. 13, 2007 entitled "Network Protection During Boot Operation", the entire contents of all applications being incorporated herein by reference.

FIELD OF THE INVENTION

The present invention relates to computer security systems, and in particular, to an improved method and system for protecting a computer system during boot operation.

BACKGROUND OF THE INVENTION

The Internet has become a place over which unwanted, potentially harmful, and otherwise unsolicited data traffic is transmitted. Since complex computer systems and networks may not always be configured securely, and the installed software on computer systems often contains software defects and other vulnerabilities, they have become a target for intruders seeking to obtain unauthorized access or even outright control of a computer system.

This phenomenon has given rise to an industry providing various tools for "defending" networks, servers and computer workstations against such traffic, while allowing legitimate traffic to pass unhindered. A "firewall" is typically software that is installed in a network node; traffic passing through a firewall is inspected by first intercepting each packet and applying a set of rules to determine whether the packet should pass or be stopped. A firewall may be implemented in a networked computer such as a server or a workstation, as well as in dedicated nodes such as network access nodes and routers.

The functionality of a firewall may range from simple address filtering in which packets with predetermined source addresses or ranges of addresses are discarded, to more complex processes, which include: discriminating traffic on the basis of the protocol, for example ICMP (Internet Control Message Protocol), UDP (User Datagram Protocol), TCP (Transmission Control Protocol), etc; filtering based on source and destination ports of each packet; tracking the connection state to determine protocol violations; and the like. If needed, more sophisticated filtering may be done on the basis of the message content itself, so called "deep" packet inspection. Many computer systems which have firewall protection nonetheless have a window of vulnerability during the system startup, or during network reconfiguration where packets may be processed contrary to intended policy, possibly compromising or damaging the computer system.

This window of vulnerability occurs during boot operation, between the time at which system network drivers are configured and the later time at which normal user applications and higher level system management services controlling the network security policy may be activated. There is also a window of vulnerability when network cards are added or reconfigured on the system while the system has been shut down. In this situation, a computer system may start up with a new network card that has no firewall protection until an administrator updates the network security policy.

One existing solution to this problem is to apply a provisional policy enabling only limited network access during boot operation. However, such a policy may not be sufficient or may be too liberal, thus causing problems with normal system startup, or still exposing the computer system to some undesired access or attack during boot operation.

Accordingly, there is a need for an improved method and system for protecting a computer system during boot operation.

SUMMARY OF THE INVENTION

There is an object of the present invention to provide a method and system for protecting a computer system during boot operation, which would avoid or mitigate the above-mentioned drawbacks of the prior art.

According to one aspect of the invention, there is provided a method of protecting a computer system in a computer network during boot operation of an operating system of the computer system, the method comprising the steps of:
(1) compiling a security profile of the computer system into a compiled security profile;
(2) storing the compiled security profile to a computer readable storage medium accessible during boot operation of the operating system of the computer system to a driver of the computer system; and
(3) by the driver, loading the compiled security profile from the computer readable storage medium into a memory of the computer system during the boot operation for the purpose of inspecting packets transmitted to and from the computer system via the computer network based on the compiled security profile.

Conveniently, the compiled security profile comprises one or more packet inspection rules compiled into definition tables and stored in a contiguous binary format.

The method further comprises the step (4), by the driver, inspecting packets transmitted to and from the computer system during the boot operation by using the one or more inspection rules.

Advantageously, the one or more packet inspection rules comprises rule data which applies to one or more network interfaces of the computer system. Alternatively, the one or more packet inspection rules may comprise rule data which applies to one or more network addresses of the computer network.

According to another aspect of the invention there is provided a method of inspecting a data packet transmitted to a computer system in a computer network during boot operation of an operating system of the computer system, the method comprising the steps of:
(1) compiling a security profile of the computer system into a compiled security profile, the security profile comprising one or more packet inspection rules;
(2) storing the compiled security profile to a computer readable storage medium accessible during boot operation of the computer system to a driver of the computer system;
(3) by the driver, loading the compiled security profile from the computer readable storage medium into a memory of the computer system during the boot operation; and
(4) by the driver, inspecting the data packet by comparing at least a portion of the data packet with at least a portion of the compiled security profile.

Beneficially, the one or more packet inspection rules comprises rule data which applies to one or more network interfaces, or one or more network addresses of the computer system.

The step (1) of the method comprises compiling the security profile into the compiled security profile, which is a binary format. Conveniently, the binary format is a contiguous binary format, comprising one or more tables.

According to one more aspect of the invention there is provided a system for protecting a computer system in a computer network during boot operation of an operating system of the computer system, the system comprising:

(1) a compiler, for compiling a security profile of the computer system into a compiled security profile and storing the compiled security profile to a computer readable storage medium; and
(2) a driver of the computer system, for loading the compiled security profile from the computer readable storage medium into a memory of the computer system during boot operation of an operating system of the computer system, and inspecting packets transmitted to the computer system by the computer network based on the compiled security profile.

The compiled security profile comprises one or more packet inspection rules in a binary format. Preferably, the one or more inspection rules comprises rule data which applies to one or more network interfaces of the computer system, or one or more network addresses of the computer network.

According to yet one more aspect of the invention, there is provided a boot protection apparatus for a computer system in a computer network, comprising:

a driver stored in a computer readable medium, the driver comprising:
  a boot module, which loads a compiled security profile comprising packet inspection rules from a computer readable storage medium into a memory of the computer system during boot operation of an operating system of the computer system, and;
  a packet module, which inspects packets transmitted to the computer system by the computer network based on the inspection rules.

Conveniently, in the boot protection apparatus, the driver comprises an NDIS intermediate driver.

A computer readable medium is also provided, comprising computer code instructions stored thereon, which when executed by a computer, perform the steps of the methods as described above.

DETAILED DESCRIPTION OF THE EMBODIMENTS OF THE INVENTION

One form of software security architecture for an IPS ("Intrusion Prevention System") or IDS ("Intrusion Detection System") according to the embodiments of the present invention includes three main components, namely "Security Center", "Deep Security Manager (DSM)", and "Agent", wherein:

"Security Center" is the server where IPS Filters, Detection Rules and Expressions are defined;

"DSM" is the server portion that runs within an enterprise to communicate to the Security Center to receive updates, run the Recommendation Engine, query the Agents, and distribute security configuration to the Agents; and "Agent" is the software that performs the IPS/IDS operations on the computer system.

As is known in the art, the boot operation of a computer system primarily involves copying the operating system components from a storage device into main memory, so that it can be executed by one or more CPUs (Central Processing Units). The period of boot operation is typically considered complete when the computer system attains a state such that it is capable of running ordinary software application programs. In general, the period of time required for booting may vary considerably depending on the operating system and the hardware in use.

Using a process known as virtualization, a computer system may also be capable of running multiple operating systems simultaneously. In a virtualized computer system, multiple virtual machines typically share hardware resources without interfering with each other so that several operating systems and applications may execute at the same time on a single computer. In this environment, the boot operation may refer to the initial startup of the entire computer system, or to the loading of one or more of the concurrently executing operating systems.

The method for protecting a computer system during boot operation according to the embodiment of the invention involves encoding a security profile for the computer system into a compiled security profile having a data structure, which is suitable for direct use by the Agent software. Portions of the Agent operate as low level network driver software, which in the Microsoft family of operating systems as one example is referred to as NDIS (Network Driver Interface Specification). Security profiles contain rules and rule data which are used by the Agent to identify various types of network traffic and determine if it should be filtered. The security profile is provided in a high level form, which in the embodiment of the invention is written in an XML based language.

In the preferred embodiment, the security profile is customized for each computer system based on the primary role of the computer system. For example, one set of filtering rules may be appropriate for a Web Server, while a different set of rules may be applied to a Database Server, since the type of expected network traffic for each computer system under normal operating conditions is different. This high level security profile is then compiled into a compiled security profile comprising a number of definition tables, to be also referred to herein as tables. The compiled security profile is written to a file or other persistent storage medium, which is convenient to access during boot operation. The compiled security profile is preferably stored in a binary format in a secure location to prevent tampering or unauthorized viewing.

In the preferred embodiment, the compiled format of the security profile comprises a plurality of definition tables which are designed to be easily transferred as a contiguous memory block. The compiled security profile uses an Index header to locate the other definition tables within the data structure of the compiled security profile. Preferably, cross references between the tables are achieved using a column referencing a row index of another table. Conveniently, because of this type of cross reference between the tables, the memory block containing the compiled security profile can be loaded and used with minimal processing by the Agent.

Note that certain columns in the compiled security profile can contain "wildcard" rows, which allow rule data to apply to groups of network interfaces or addresses. This assists in preventing a computer system that is otherwise secure from being vulnerable during the period of time that a computer system boot operation commences with a newly installed network interface.

During boot operation, the driver component of the Agent, herein referred to as the Agent Driver, is loaded into memory and activated by an operating system on the computer system. In the preferred embodiment, the Agent Driver is implemented as a miniport intermediate driver in the Windows NDIS architecture that relays data packets between the lower layer hardware drivers and the upper layer protocol stack. During boot operation, the Agent Driver loads the compiled security profile into computer memory as soon as possible, which allows the Agent Driver to perform packet inspection and filtering functions according to the rules defined in the compiled security profile.

Figure 1:
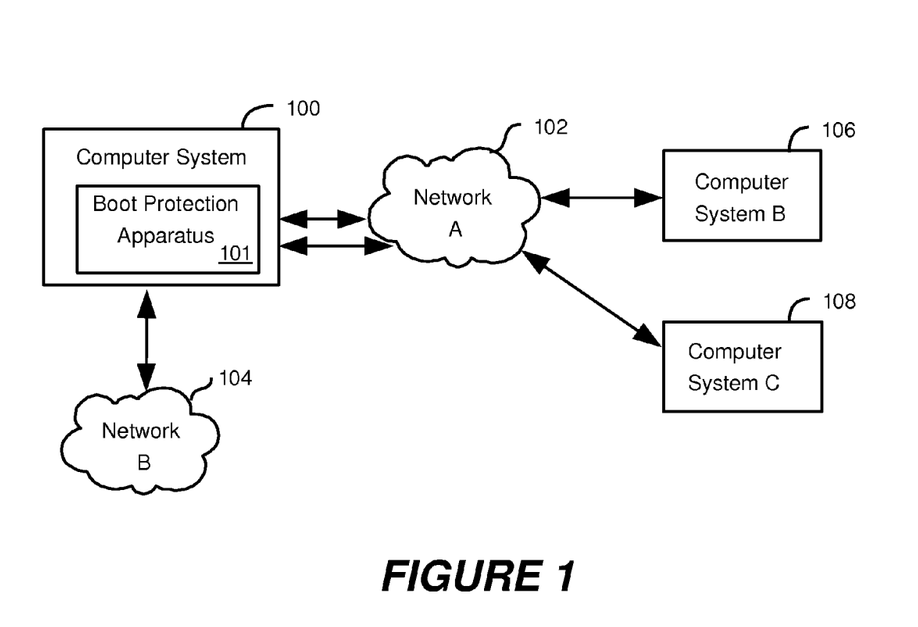
FIG. 1 shows a computer system according to an embodiment of the present invention in a network environment.

With reference to the diagrams, FIG. 1 shows the computer system 100 according to an embodiment of the present invention in the network environment. The Computer System 100 may be connected to one or more computer networks, of which only two networks, Network A (102) and Network B (104) are shown. The networks 102, 104, in turn, may be connected to other computer systems, of which only two computer systems, Computer System B (106) and Computer System C (108), are shown in FIG. 1. The Computer System 100 comprises Boot Protection Apparatus 101, which performs the packet inspection and filtering functions during boot operation of the computer system 100.

Figure 2:
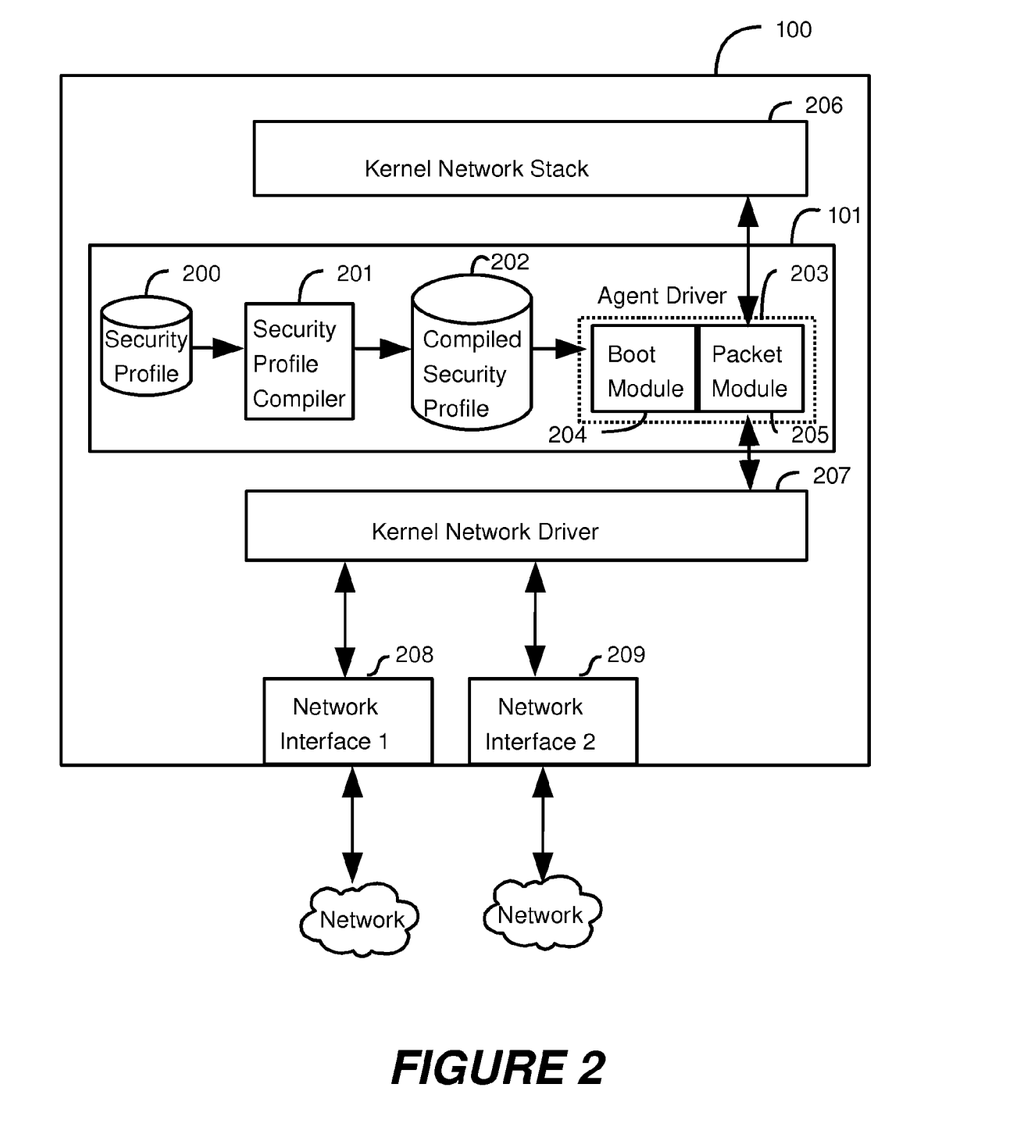
FIG. 2 shows an expanded block diagram of the computer system 100, and functional components of the Boot Protection Apparatus 101 of FIG. 1.

FIG. 2 shows an expanded block diagram of the computer system 100, and functional components of the Boot Protection Apparatus 101 of FIG. 1.

The computer system 100 including Boot Protection Apparatus 101 operates in the following manner. Security Profile Compiler 201 uses the Security Profile 200 to produce the Compiled Security Profile 202. Further details of the Compiled Security Profile 202 are given in FIG. 4. During boot operation, Boot Module 204 of Agent Driver 203 reads Compiled Security Profile 202 into computer memory. Packet Module 205 then performs packet inspection and filtering functions on packets transmitted and received by the computer system.

In general, received packets from one or more network interfaces shown as 208 and 209 are initially processed by the Kernel Network Driver 207. Packets are then processed by the Packet Module 205 of the Agent Driver 203 according to the Compiled Security Profile 202. The Packet Module 205 may discard the packet if the contents of the packet match a rule in the Compiled Security Profile 202. Otherwise, the packet is passed in this case to the Kernel Network Stack 206 where it is processed by the operating system of the computer system in an ordinary way. Packets, which are intended for transmission from the computer system, originate from the Kernel Network Stack 206 and are also processed by the Packet Module 205 of the Agent Driver 203 according to the data in the Compiled Security Profile 202. Again, the Packet Module 205 may discard a packet if the contents of the packet match a rule in the Compiled Security Profile 202. Otherwise, the packet is passed to the appropriate network interface where it is processed and transmitted in an ordinary way.

Figure 5:
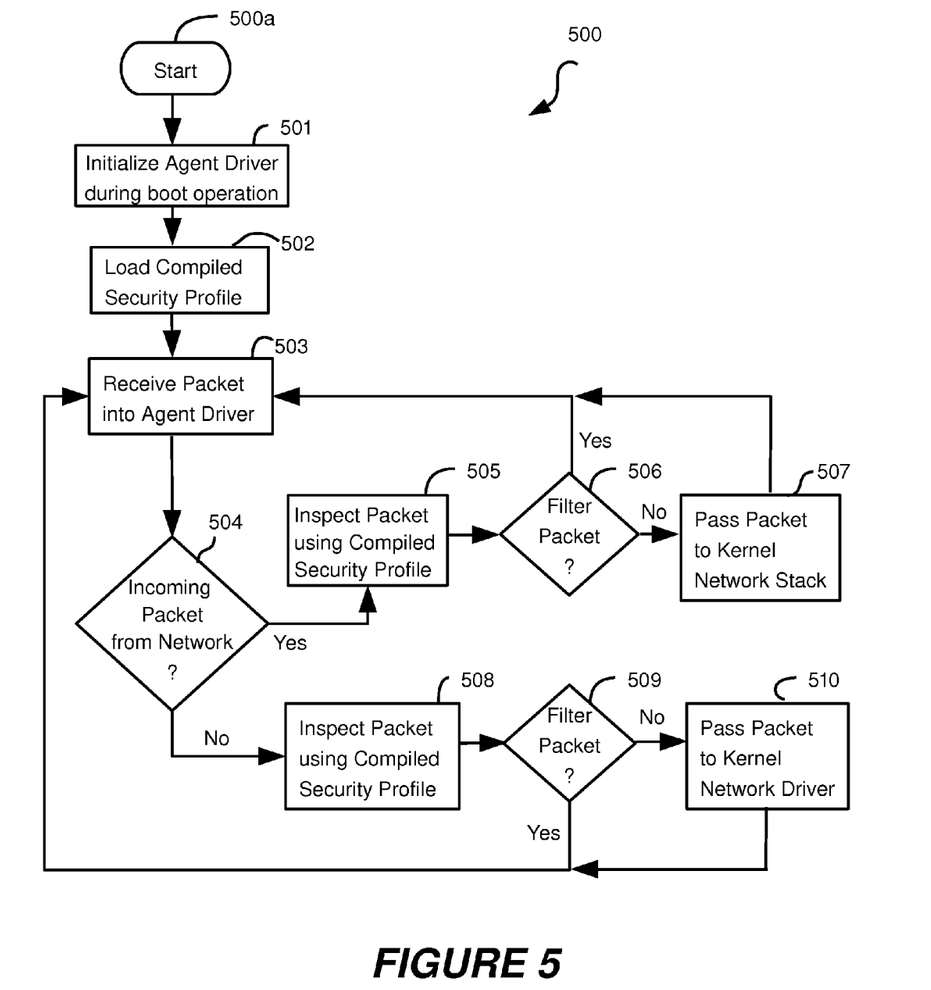
FIG. 5 shows a flow chart 500 illustrating operation of the Agent Driver 203 of the Boot Protection Apparatus 101 of FIG. 2.

Further details of the packet inspection and filtering functions are given in FIG. 5.

Figure 3:
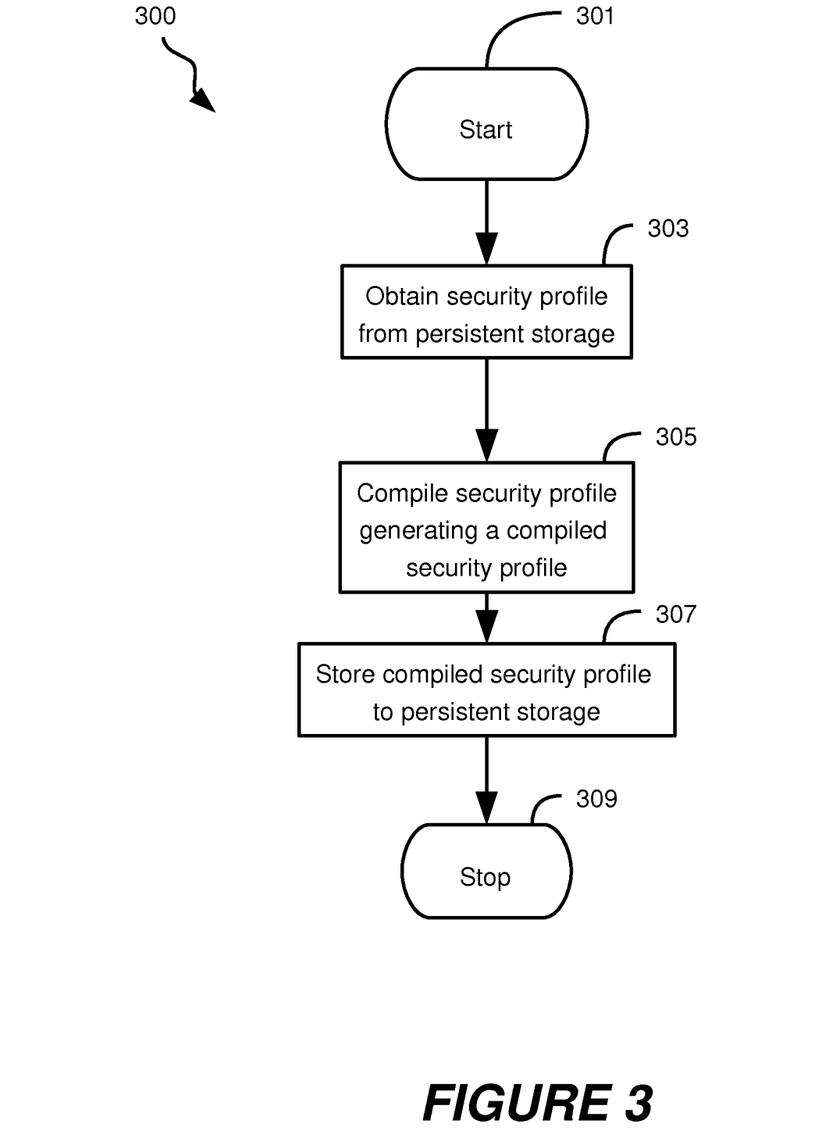
FIG. 3 shows a flow chart 300 illustrating operation of the Boot Protection Apparatus 101 of FIG. 2.

FIG. 3 is a flow chart 300 illustrating operation of the Boot Protection Apparatus 101 of FIG. 2. Upon Start (step 301), in step 303, the security profile 200 in the high level form is obtained from persistent storage. The security profile 200 is preferably in the XML format, and is generated by an application outside the scope of this invention. For example, a portion of the security profile 200 may contain XML similar to the following:

```
<NetworkPolicy>
    <SystemSetting blockIpV6="1" FragmentTimeout="100"/>
    <InterfaceConfig interface="*" denyFragmentedPackets="true"/>
    <InterfaceConfig interface="00:40:30:10:fe:02"
    denyFragmentedPackets="false"/>
    <PacketFilter protocol="tcp" direction="incoming"
    action="deny">
    <SourceInfo/>
    <DestInfo addr="10.0.1.96"/>
    </PacketFilter>
    <PacketFilter protocol="udp" direction="outgoing"
    action="deny">
    <SourceInfo addr="10.0.1.96"/>
    <DestInfo addr="10.0.0.28"/>
    </PacketFilter>
</NetworkPolicy>
```

In step 305, the security profile 200 is compiled by the security profile compiler 201 into the compiled security profile 202, which is preferably a compact binary format that can be processed later by the Agent Driver 203 with minimal processing. In step 307, the compiled security profile 202 is stored to persistent storage, to a location which is accessible to the Agent driver 203 during boot operation, following by termination of the flowchart 300 (step 309).

Figure 4:
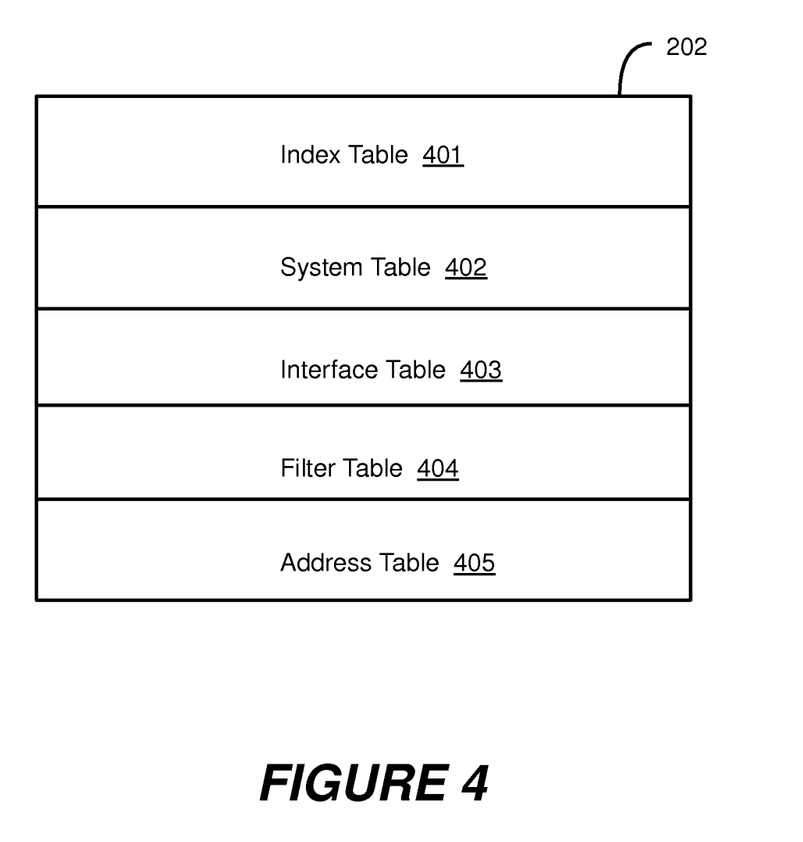
FIG. 4 illustrates the Compiled Security Profile 202 of FIG. 2 in more detail.

FIG. 4 illustrates the Compiled Security Profile 202 of FIG. 2 in more detail.

The Compiled Security Profile 202 includes a number of tables, namely Index Table 401, System Table 402, Interface Table 403, Filter Table 404, and Address Table 405, which are preferably laid out contiguously.

The Index Table 401

Index Table 401 is the first table in the Compiled Security Profile 202. The Index Table 401 is used to quickly determine the size and location of the other tables once the compiled security profile is loaded into memory of the computer system 100, and comprises the following rows:

| Column | Meaning |
| --- | --- |
| 0 | number of rows in System table |
| 1 | number of rows in Interface table |
| 2 | number of rows in Filter table |
| 3 | number of rows in Address table |

For example, the address of System Table 402 may be quickly computed as the base memory address of the compiled security profile plus the size of the Index table.

Similarly, the address of Interface Table 403 may be computed as the address of the System Table 402, plus the number of rows of the System Table 402 (given by Index table column 0) multiplied by the length of a row in the System Table 402. The length of a row within a table is fixed for all rows in the table.

The addresses of the Filter Table 404 and Address Table 405 are computed similarly to those above. It is contemplated that any number of additional tables may be included in the Security Profile 202 to support further packet filtering functionality.

The System Table 402

System Table 402 includes multiple rows, with each row comprising two columns, each typically one word in size. For example,

| Column | Meaning |
| --- | --- |
| 0 | The setting identifier (integer id) |
| 1 | The setting value (integer word) |

The setting identifier enumerates one of a list of possible predefined settings. The behavior of the settings is defined by the setting value (V).

| Enumeration | Name | Meaning |
| --- | --- | --- |
| 0 | Allow IPV6 | Allow packets with version == 6, if V = 1 |
| 1 | Fragment Timeout | Discard incomplete fragments after V milliseconds |
| ... | ... | Additional settings ... |

These values are shown to illustrate the way that the tables may be encoded in a compact fashion. If required, additional values can be defined to control packet filtering.

The Interface Table 403

Interface Table 403 comprises one or more rows, with each row containing multiple columns which govern packet processing behavior in a similar way to the System Table 402, but on a per interface basis. One or more network interfaces 208, 209 of the computer system 100 are each given an integer identifier (1, 2, 3 . . . ) corresponding to an entry in the Interface Table 403. In general, network interfaces 208, 209 each have an associated MAC address, which is a persistent hardware identifier. Conveniently, the Interface Table 403 includes the MAC address to ensure that the same identifier is persistently assigned to the same physical interface.

The packet processing for a packet received or transmitted on the network interface 1 (208) is influenced by changing the setting in the row with column ID having value 1. If there is no row corresponding to the network interface 1 (208), on which a packet is received or transmitted, then the 0$^{th}$ row of this table is used to govern the packet processing. This is especially useful, for example, when network interfaces are added or replaced on the computer system 100, and then it is rebooted.

| Column | Meaning | Size/Type |
| --- | --- | --- |
| 0 | Ethernet Mac Address | 8 bytes |
| 1 | Deny Fragmented Packet | Integer word (0 = off) |
| ... | Additional values | |

As required, additional values could be defined in the Interface Table 403 to control packet filtering.

The Filter Table 404

Filter Table 404 includes one or more rows, with each row comprising a rule. The packet module 205 iterates over each of these rows in turn to decide if a packet should be accepted or discarded. If the packet matches one of the rows in the Filter Table 404, then the packet is discarded. If, after processing all rows in the Filter Table 404, the packet does not match, then it is accepted. For example,

| Column | Name | Meaning | Size/Type |
| --- | --- | --- | --- |
| 0 | Protocol | Matches the packet protocol field | word |
| 1 | Direction | 0 matches an incoming packet 1 matches an outgoing packet | word |
| 2 | Source | 0 matches any packet source address Non-zero is an index into the address table | word |
| 3 | Destination | 0 matches any packet destination address Non-zero is an index into the address table | word |

Recalling the Packet module 205 from FIG. 2 and to illustrate how the Filter Table 404 is used in packet processing, a row which contained the protocol value "6" and direction "0" with the source and destination column entries both "0" would match any incoming packet, which had protocol value 6, causing all such packets to be discarded.

The Address Table 405

Address Table 405 comprises one or more rows, with each row containing an address. In the preferred embodiment the address is represented as a 32 bit integer.

| Column | Name | Meaning | Size/Type |
| --- | --- | --- | --- |
| 0 | IP address | An IP address | Double word |

A row is created for each unique, non-zero source or destination address entry in the Filter Table 404.

Thus, collectively, the definition tables 401-405 provide a binary format of the Compiled Security Profile 202, including packet inspection rules.

FIG. 5 shows a flow chart 500 illustrating operation of the Agent Driver 203 of the Boot Protection Apparatus 101 of FIG. 2. Upon Start (step 500a), steps 501 and 502 are performed by the Boot Module 204 of the Agent Driver 203. After the Compiled Security Profile 202 is loaded in computer memory in step 502, the Packet Module 205 is ready for inspecting packets in subsequent steps.

In step 503, a packet is received by the Agent Driver 203 as originally described with regard to FIG. 2. The decision made in step 504 determines if the packet was received from the Kernel Network Driver 207 or the Kernel Network Stack 206. This establishes the direction of the packet (incoming or outgoing) which is used to select the appropriate rules. If the packet is incoming from a network (exit "YES" from step 504), step 505 is executed to inspect the packet according to the compiled security profile, and step 506 determines if the packet should be discarded. If the packet is discarded (exit "YES" from step 506), the flow-chart 500 returns back to step 503 to process the next packet. If the packet is not to be discarded (exit "NO" from step 506), the packet is passed on to the Kernel Network Stack 206 for processing before the process returns to step 503 for the next packet (step 507). For a packet traveling in the other direction (in other words, the packet destined for the network), which corresponds to exit "NO" from step 504, the packet is inspected in step 508 according to the compiled security profile, and the filtering decision is determined in step 509. If the packet is discarded (exit "YES" from step 509), the flowchart 500 returns back to step 503 to process the next packet. If the packet is not to be discarded (exit "NO" from step 509), it is passed on to the Kernel Network Driver 207 for processing before the process returns to step 503 for the next packet (step 510). The flow of network traffic both to and from the computer system 100 continues to be monitored in this fashion.

Although the various methods described above are conveniently carried out on a general purpose computer, one of ordinary skill in the art would recognize that such methods may be carried out in hardware, in firmware, or in a more specialized apparatus constructed to perform the required steps. The type of computer network used may be a version of Internet Protocol (IP) network, or any other appropriate packet network. The format of the compiled security profile 202 can also easily be extended to accommodate additional table structures and other data as needed to protect the computer system 100 during boot operation. Further, the table structures may be organized in any appropriate format, and the sizes of individual column entries may be expanded or reduced as needed to accommodate other networks, addressing structures, or other data stored in the compiled security profile.

Thus, an improved method and system for protecting a computer system during boot operation has been provided.

The present invention provides the following advantages. It addresses the problem of vulnerability during computer system boot operation where network packets may be processed contrary to intended policy, possibly compromising or damaging the computer system. Computer systems, to be protected by the system and method of the embodiments of the invention, may have single or multiple network interfaces. In addition, the computer system may be powered on or booted with a new network interface and still receive the benefit of IDS/IPS protection, without the need to wait until an administrator can apply a security profile to the interface.

Although the embodiments of the invention have been described in detail, it will be apparent to one skilled in the art that variations and modifications to the embodiments may be made within the scope of the following claims.

What is claimed is:

1. A computer network, comprising:
one or more computers arranged in the computer network;
a system for protecting at least one computer of said one or more computers during boot operation of an operating system of the at least one computer, the system comprising:
a persistent computer storage medium, storing a compiled security profile thereon for execution by a processor of the at least one computer, for inspecting packets transmitted to or from the at least one computer;
the persistent computer storage medium being accessible to the operating system during an early stage of the boot operation of the operating system when kernel mode services are available but before user mode services become available; and
a memory of the at least one computer, having computer readable instructions stored thereon for execution by the processor, forming a network driver of the operating system configured to load the compiled security profile from the persistent computer storage medium into the memory during the early stage of the boot operation of the operating system for inspecting packets, transmitted to or from the at least one computer, according to the compiled security profile.

2. The computer network of claim 1, wherein compiled security profile comprises one or more packet inspection rules for analyzing at least a portion of a packet using at least a portion of the compiled security profile.

3. The computer network of claim 2, wherein the one or more packet inspection rules further comprise a rule related to a network interface of the at least one computer.

4. The computer network of claim 2, wherein the one or more packet inspection rules further comprise a rule related to a network address of the computer network.

5. The computer network of claim 2, wherein the one or more packet inspections rules further comprise a rule related to operating one of a web server or a database server.

6. The computer network of claim 2, wherein the computer readable instructions are further configured to apply different inspection rules of the compiled security profile to the packets transmitted to the at least one computer and to the packets transmitted from the at least one computer.

7. The computer network of claim 1, wherein the network driver is a kernel network driver of the operating system.

8. The computer network of claim 1, wherein the network driver comprises an NDIS (Network Driver Interface Specification) intermediate driver.

9. The computer network of claim 1, wherein the computer readable instructions are further configured to inspect packets, transmitted to or from the at least one computer, whose operating system is undergoing the boot operation, according to the compiled security profile.

10. The computer network of claim 1, wherein the operating system comprises one or more operating systems running in a virtualized environment.

11. The computer network of claim 1, wherein the compiled security profile is in a binary format.

12. The computer network of claim 11, wherein the binary format comprises one or more tables.

13. The computer network of claim 12, wherein said one or more tables comprise one or more of the following:
an index table comprising size and location of other tables;
a filter table comprising packet inspection rules;
an address table comprising one or more network addresses of the computer network; and
an interface table comprising addresses of one or more network interfaces of the computer network.

14. The computer network of claim 1, the computer network being a packet network.

15. The computer network of claim 1, the computer network being an Internet Protocol network.

16. A computer network, comprising:
one or more computers arranged in the computer network;
at least one computer of said one or more computers comprising a boot protection apparatus for protecting the at least one computer during boot operation of an operating system of the at least one computer, the boot protection apparatus comprising:
a memory device comprising computer readable instructions stored thereon for execution by a processor, forming:
a network driver of the operating system, comprising:
(i) a boot module for loading a compiled security profile stored in a persistent storage medium and comprising packet inspection rules, into the memory device during an early stage of the boot operation of an operating system of the at least one computer when kernel mode services are available but before user mode services become available; and (ii) a packet module for inspecting packets transmitted to or from the at least one computer during the early stage of the boot operation of the operating system according to the inspection rules.

17. The computer network of claim 16, wherein the compiled security profile comprises one or more packet inspection rules for analyzing at least a portion of a packet using at least a portion of the compiled security profile.

18. The computer network of claim 17, wherein the computer readable instructions are further configured to apply different inspection rules of the compiled security profile to the packets transmitted to the at least one computer and to the packets transmitted from the at least one computer.

19. The computer network of claim 16, the computer network being:

a packet network; and an Internet Protocol network.

20. The computer network of claim 16, wherein the operating system comprises one or more operating systems running in a virtualized environment.

* * * * *